United States Patent Office 3,506,710
Patented Apr. 14, 1970

3,506,710
UREA SYNTHESIS PROCESS WITH SOLUTION RECYCLE
Shigeru Inoue, Kamakura, and Eiji Otsuka and Kazumichi Kanai, Fujisawa, Japan, assignors to Toyo Koatsu Industries, Incorporated, Tokyo, Japan
Filed Oct. 10, 1967, Ser. No. 674,211
Claims priority, application Japan, Oct. 14, 1966, 41/67,223
Int. Cl. C07c 127/04
U.S. Cl. 260—555          10 Claims

ABSTRACT OF THE DISCLOSURE

A urea synthesis process having solution recycle wherein the unreacted gasses are separated from the urea effluent at progressively decreasing pressures; are absorbed by absorbates at progressively increasing pressures to produce a final absorbate containing little water which is returned to the urea synthesis step.

---

Figure 1:
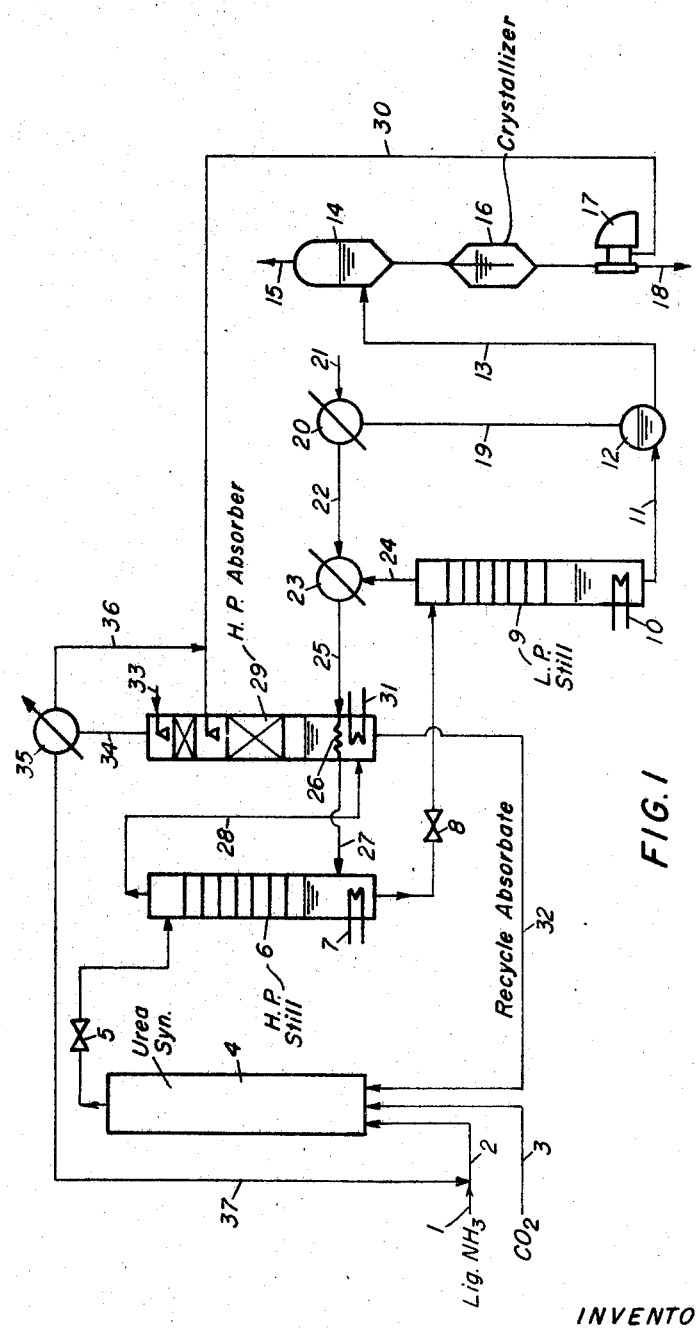

This invention relates to an improvement in a total recycle urea synthesis process utilizing solution recycle.

The total recycle process for the synthesis of urea from ammonia and carbon dioxide using a solution recycle is generally conducted by reacting ammonia and carbon dioxide at a urea synthesizing pressure and temperature. The effluent of this reaction contains urea, unreacted ammonia, unreacted carbon dioxide and water which is reduced in two or three steps from a high pressure to a low pressure and distilling off the unreacted ammonia and carbon dioxide by heating at the respective pressures. The urea is recovered by conventional methods from the resulting aqueous solution of urea. The unreacted ammonia and carbon dioxide which have been distilled off, are recovered as a gaseous mixture with water vapor and the low pressure gaseous mixture separated is absorbed by water or an aqueous solution of ammonia or urea at a low pressure and this solution is then used to absorb the gaseous mixtures separated at higher pressures. The final solution is therefore formed by absorbing the unreacted synthesis gasses by a series of absorptions, each of which is conducted at a pressure higher than the preceding and the resulting absorbate is returned to urea synthesis reaction.

The unreacted ammonia and carbon dioxide are returned to the urea synthesis reaction as an aqueous solution of ammonium carbamate formed as described above and results in an excess of water being introduced into the urea synthesis reaction. The excess water has an adverse influence on the urea synthesis reaction and reduces the percentage of reaction gases converted at a given temperature, pressure and reaction time. While it is preferred that the amount of water present in the synthesis autoclave is small, the absorption steps require sufficient water to absorb the unreacted ammonia and carbon dioxide. Therefore, a urea synthesis process utilizing a solution recycle has heretofore been considered impractical due to the low conversion of the reaction gasses.

The composition of the absorbate of the high pressure absorption is not sufficiently concentrated due to the large amount of water in the low pressure absorbate. If all the unreacted ammonia and carbon dioxide can be absorbed without using the low pressure absorbate as an absorbent in the high pressure absorption, a concentrated aqueous solution of ammonium carbamate can be obtained and the amount of water entering the urea synthesis reaction is greatly reduced and the conversion to urea increased.

The urea synthesis process of the present invention comprises reacting ammonia with carbon dioxide at urea synthesis temperatures and pressures in a urea synthesis zone. The resulting urea synthesis effluent is distilled in a high pressure distillation zone to separate most of the unreacted ammonia and carbon dioxide as a first gaseous mixture; then the residue is distilled in a low pressure distillation zone to separate most of the remaining unreacted ammonia and carbon dioxide as a second gaseous mixture and the resulting residue, an aqueous solution of urea, is concentrated to recover the urea as crystals. The second gaseous mixture is absorbed in water, an aqueous ammonia solution or urea mother liquor to form a first absorbate; which is then pressurized to the pressure of the high pressure distillation zones; and introduced, after having the temperature elevated by heat exchanger, into the high pressure distillation zone wherein the gasses are separated along with the gasses of the urea synthesis effluent and dissolved in the remaining urea mother liquor or in water or an aqueous ammonia solution, or some of the urea synthesis effluent as the absorbent. The second absorbate, thus formed, is returned to the urea synthesis zone.

In the present invention, a part or all of the first absorbate may be introduced into the high pressure distillation zone. If a part of the first absorbate is introduced into the high pressure distillation zone, the remainder is used as part of the absorbent for the first gaseous mixture. If all of the first absorbate is introduced into the high pressure distillation zone the amount of the ammonia and carbon dioxide in the first absorbate is substantially equal to the amount of the ammonia and carbon dioxide contained in the residue withdrawn from the high pressure distillation zone. Therefore, if the first absorbate is returned to the high pressure distillation zone, the composition of the residue withdrawn from the high pressure distillation zone is substantially constant and practically all of the unreacted ammonia and carbon dioxide are separated during the high pressure distillation.

When a part of the first absorbate is introduced into the high pressure distillation zone and water or an aqueous ammonia solution is used as the absorbent for the second gaseous mixture, a mixture of the remaining portion of the first absorbate and the urea mother liquor is used as the absorbent for the first gaseous mixture. However, if the urea mother liquor is used as an absorbent for the second gaseous mixture, the remainder of the first absorbate, or a mixture of the remainder of the first absorbate and water, an aqueous ammonia solution, the urea mother liquor or some of the urea synthesis effluent is used as the absorbent for the first gaseous mixture. When all of the first absorbate is introduced into the high pressure distillation zone, water or an aqueous ammonia solution is used as the absorbent for the first gaseous mixture. If the urea mother liquor is used as the absorbent for the second gaseous mixture water, an aqueous ammonia solution, some of the urea mother liquor or some of the urea synthesis effluent is used as an absorbent for the first gaseous mixture.

The amount of heat generated by absorption of the first gaseous mixture from the high pressure distillation is greater than that which can be utilized to heat the first absorbate, which is fed into the high pressure distillation zone. The excess heat can be effectively used to raise the temperature of the aqueous solution of urea in the vacuum concentrator.

In practicing the present invention by using the urea mother liquor as the absorbent for the second gaseous mixture, the urea mother liquor first absorbs the second gaseous mixture, is then heated and subjected to high pressure distillation. Therefore, any biuret in the urea mother liquor is converted to urea during the heating and distilling steps and the accumulation thereof is avoided even if the urea mother liquor is not returned to the urea synthesis zone.

Figure 2:
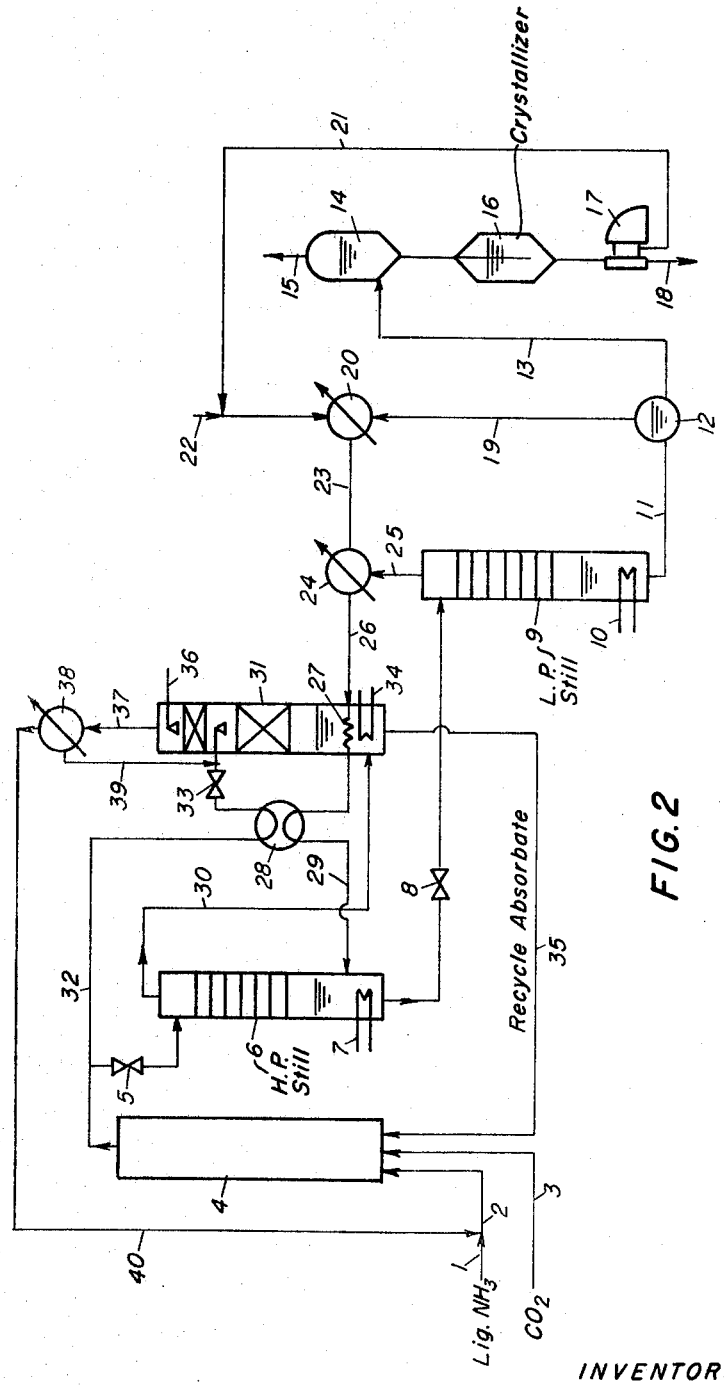

Although the processes diagrammatically represented by FIGURES 1 and 2 only illustrate using all of the first absorbate in the high pressure distillation, the procedure for using a part of the first absorbate will be apparent after the following explanations.

In the process illustrated by FIGURE 1, liquid ammonia from line 1 and recovered liquid ammonia from line 37 are introduced through line 2 into urea synthesis autoclave 4, carbon dioxide is introduced through line 3 and recycled absorbate is introduced through line 32. The reaction is conducted at a temperature of 160 to 220° C. under a gauge pressure of 150 to 400 kg./cm.$^2$ with a preferred mol ratio of the total ammonia to total carbon dioxide in synthesis autoclave of from 2.5 to 6:1. The urea synthesis effluent withdrawn from the autoclave, which contains urea, unreacted ammonia, unreacted carbon dioxide and water, has the pressure lowered by reduction valve 5 to 15 to 30 kg./cm.$^2$ gauge and the effluent is then introduced into high pressure distillation column 6. Most of the unreacted ammonia and carbon dioxide separate as a gaseous mixture and to minimize the amount of water in the distilled gaseous mixture, high pressure distillation column 6 has a zone containing plates or packing. The head temperature during distillation is usually maintained at about 110 to 150° C. by urea synthesis effluent fed to the upper part of high pressure distillation column 6, while heat is applied at the bottom of the column by steam heater 7 to maintain the temperature at 140 to 170° C. The amount of water in the gaseous mixture distilled out of high pressure distillation column 6 is thereby minimized and the water content of the gaseous mixture is in the order of several percent by volume. The residue from high pressure distillation column 6 which contains urea, 6 to 10% by weight ammonia and 2 to 5% by weight carbon dioxide, has the pressure lowered by reduction valve 8 to 0 to 5 kg./cm.$^2$ gauge and is then fed to the upper part of low pressure distillation column 9 wherein the remaining unreacted ammonia and carbon dioxide are separated as a gaseous mixture. It is preferred that low pressure distillation column 9 has the same type of zone having plates or packing as high pressure distillation column 6. The head temperature is kept at 80 to 130° C. and the temperature in the lower portion of still 9 is kept at 120 to 140° C. by steam heater 10. If necessary, the residue or low pressure distillation column 9 has the pressure further reduced and is fed into gas separator 12 through line 11 to substantially remove any remaining unreacted ammonia and carbon dioxide as a gaseous mixture at a temperature of about 100 to 140° C. If substantially all of the unreacted ammonia and carbon dioxide can be separated in low pressure distillation column 9, gas separator 12 can be omitted.

The aqueous residue containing urea from gas separator 12 or low pressure distillation column 9 is conducted into vacuum concentrator 14 by a line 13. The water produced as a result of the urea synthesis reaction as well as any water introduced from outside the urea synthesis system are removed under a pressure of 60 to 300 mm. Hg through line 15. The concentrated urea is fed through crystallizer 16 at a temperature of 40 to 70° C. and the aqueous solution containing urea crystals formed therein has said crystals separated by centrifugal separator 17. The urea is recovered as crystals from line 18.

The gaseous mixture obtained from gas separator 12 is conducted to gas condenser 20 through line 19 wherein it is condensed by water or aqueous ammonia solution entering through line 21 at 40 to 60° C. The resulting absorbate enters low pressure absorber 23 as the absorbent through line 22 and absorbs the gaseous mixture from low pressure distillation column 9 entering through line 24 at 40 to 60° C. Some of the gaseous mixture from the low pressure distillation column 9 may be used to heat the aqueous solution of urea in concentrator 14, whereby the heat generated by the condensation of the gaseous mixture is utilized for concentrating the aqueous solution of urea. The remaining portion of the gaseous mixture is then absorbed as described above. If gas separator 12 is omitted, gas condenser 20 is also omitted and water or aqueous ammonia solution is introduced directly as the absorbent in low pressure absorber 23. The pressure of the absorbate from low pressure absorber 23 is increased to the pressure of high pressure distillation column 6 by means of a pump (not illustrated) in line 25 and is then conducted through cooling pipe 26 in the bottom of high pressure absorber 29. The exchange of heat with the absorbate of high pressure absorber 29 elevates the temperature of the absorbate in pipe 27 to about 90 to 120° C. If necessary the absorbate is further heated to 140 to 170° C. before being fed to the bottom of high pressure distillation column 6. The ammonia and carbon dioxide contained in the absorbate are separated as a gaseous mixture with the unreacted ammonia and carbon dioxide of the urea synthesis effluent. This gaseous mixture is introduced into the bottom of high pressure absorption column 29 by line 28 and is absorbed by the urea mother liquor from centrifugal separator 17. Some of the heat of absorption is removed by cooling pipe 26 but excess heat is removed by heat exchanger 31 using the aqueous solution containing urea and/or urea crystals from vacuum concentrator 14 or crystallizer 16. This excess heat is used as a heat source to aid in the evaporation of water from the aqueous solution of urea. When the absorbate temperature can not be maintained at 100 to 130° C. by such means, additional water cooling is used. The absorbate of high pressure absorption column 29 is conducted to urea synthesis autoclave 4 through line 32. Since the excess ammonia not absorbed in high pressure absorber 29 contains some carbon dioxide, it is washed with water, aqueous ammonia solution or the urea mother liquor introduced through line 33, and then liquified by ammonia condenser 35. A portion of the liquid ammonia is introduced through line 37 to autoclave 4.

FIGURE 2 illustrates use of urea mother liquor as the absorbent for the gaseous mixture from the low pressure distillation and the use of some of the urea synthesis effluent as the absorbent for the gaseous mixture from the high pressure distillation.

According to the process shown in FIGURE 2, liquid ammonia from line 1 and recovered liquid ammonia from line 40 are introduced by line 2, carbon dioxide fed by line 3 and recycle absorbate fed by line 35 are introduced into urea synthesis autoclave 4. The reaction is conducted at a temperature of 160 to 220° C. under a gauge pressure of 150 to 400 kg./cm.$^2$ and the mol ratio of total ammonia to total carbon dioxide in autoclave 4 is preferably 2.5 to 6:1. The majority of the urea synthesis effluent from autoclave 4 has the pressure reduced by reduction valve 5 to 15 to 30 kg./cm.$^2$ gauge and is introduced into high pressure distillation column 6 wherein most of the unreacted ammonia and carbon dioxide are separated as a gaseous mixture. High pressure distillation column 6 is operated under the same conditions as the process of FIGURE 1. The pressure of the residue from high pressure distillation column 6 is reduced by reduction valve 8 to 0 to 5 kg./cm.$^2$ gauge and the residue is then introduced into low pressure distillation column 9. The majority of unreacted ammonia and carbon dioxide in the residue is separated as a gaseous mixture in the same manner as the process of FIGURE 1. After the pressure of the residue from low pressure distillation column 9 is further reduced if necessary, the residue is fed into vacuum concentrator 14 through line 13 wherein it is concentrated at a pressure of 60 to 300 mm. Hg and water produced by the urea synthesis reaction or introduced from outside the system is removed. The concentrated aqueous solution is then fed to crystallizer 16 maintained at a temperature of 40 to 70° C. and urea crystals are separated from the aqueous solution of urea from crystallizer 16 by centrifugal separator 17.

The gaseous mixture from separator 12 is fed into gas condenser 20 through line 19, wherein it is condensed and absorbed by urea mother liquor fed from line 21 at 40 to 60° C. and, if necessary, with the water or aqueous ammonia solution introduced from line 22 to produce an aqueous absorbate of ammonium carbamate.

The absorbate is introduced into low pressure absorber 24 through line 23 at 40 to 60° C. and absorbs the gaseous mixture recovered from low pressure distillation column 9 and introduced through line 25. Some of the gaseous mixture from the low pressure distillation column 9 may be used to heat the aqueous solution of urea in concentrator 14, whereby the heat generated by the condensation of the gaseous mixture is utilized for concentrating the aqueous solution of urea and the remaining portion of the gaseous mixture is absorbed in the urea mother liquor. If gas separator 12 is omitted, gas condenser 20 is also omitted and urea mother liquor and if necessary water or an aqueous ammonia solution, is introduced as the absorbent in low pressure absorber 24. The pressure of the absorbate produced in low pressure absorber 24 is increased above the pressure of high pressure distillation column 6, for example, from 30 to 40 kg./cm.$^2$ gauge by means of a pump (not illustrated) in line 26 and is then conducted through cooling pipe 27 provided in the bottom of high pressure absorber 31. The exchange of heat with the absorbate of the high pressure absorber 29 elevates the temperature to 90 to 120° C. and the hot absorbate is passed through additional heat exchanger 28, wherein the temperature is further increased by the urea synthesis effluent from autoclave 4 to about 140 to 190° C. The pressure is reduced if necessary to that of high pressure distillation column 6 and the low pressure absorbate is fed into high pressure distillation column 6 by line 29. The ammonia and carbon dioxide contained in the absorbate are separated as a gaseous mixture with the unreacted ammonia and carbon dioxide separated from the urea synthesis effluent. When high pressure distillation column 6 has a zone which has plates or packing, the absorbate in line 29 may be introduced into this zone. The gaseous mixture from high pressure distillation column 6 is introduced into the bottom of high pressure absorber 31 by line 30. The part of the urea synthesis effluent not distilled is cooled by passing through heat exchanger 28; the pressure is lowered by reduction valve 33 and the effluent is introduced into high pressure absorber 31 as the absorbent for the gaseous mixture entering through line 30. If water, an aqueous ammonia solution or urea mother liquor are preferred instead of the urea synthesis effluent, all of the urea synthesis effluent is fed into high pressure distillation column 6 after the pressure has been reduced. Some of the heat of absorption is removed by the low pressure absorbate passing through exchanger 27 and the excess heat is removed by passing the aqueous solution containing urea from vacuum concentrator 14 or crystallizer 16 through cooling pipe 34 in the bottom part of high pressure absorber 31. This excess heat is then utilized for evaporating water from the aqueous solution containing urea. If the temperature of the absorbate can not be maintained at 100 to 130° C., additional cooling may be provided by water. The absorbate from the high pressure absorber is then fed into urea synthesis autoclave 4 through line 35. The excess ammonia not absorbed contains a small amount of carbon dioxide, which is removed by washing with the water, aqueous ammonia solution or urea mother liquor introduced into high pressure absorber 31 through line 36. Ammonia gas is liquified by ammonia condenser 38 which is cooled with water. Some of the liquid ammonia is introduced through line 39 into high pressure absorber 31 with the urea synthesis effluent as the absorbent and the remainder of the liquid ammonia is fed through line 40 to urea synthesis autoclave 4.

The present invention has the following advantages:

(1) The absorbate recycled to the urea synthesis autoclave from the high pressure absorption has only 10 to 20% water by weight because the absorbate of the low pressure absorption is distilled and not recycled while all of the unreacted ammonia and carbon dioxide are recovered from the low pressure absorbate.

(2) The small amount of water recycled to the urea synthesis increases the conversion rate 10% above the conversion rate when the absorbate from the low pressure absorption is recycled to the urea synthesis.

(3) The conversion efficiency increases such that the amount of unreacted ammonia and carbon dioxide is reduced; the amount of absorbate needed for high pressure absorption is reduced and the amount of power consumed is reduced.

(4) The heat balance in the urea synthesis system is improved by the small amount of water recycled. Therefore, reducing the mol ratio of $NH_3/CO_2$ in the urea synthesis, the urea synthesis temperature can be elevated and the conversion ratio increased. The urea synthesis pressure does not vary as much when this procedure is followed.

(5) With the improved conversion ratio, the amount of the unreacted ammonia and carbon dioxide in the urea synthesis effluent is reduced and the amount of steam consumed during separation thereof is reduced.

(6) The heat generated in the high pressure absorption is used so effectively that, even if the absorbate in the low pressure absorption is treated with high pressure distillation, the total steam consumption is not increased and when a part of the urea synthesis effluent is used as an absorbent in the high pressure absorption, its heat is utilized to increase the temperature of the absorbate from the low pressure absorption.

(7) The crystalline product contains very little biuret and since the urea mother liquor is treated in a manner adapted to convert the biuret into urea, biuret does not accumulate in the system.

(8) If urea mother liquor is used as the absorbent in the low pressure absorption and urea synthesis effluent is used as the absorbent in the high pressure absorption, some of the unreacted ammonia and carbon dioxide are returned to the urea synthesis without first being absorbed and the amount of steam consumed is thereby reduced.

The following examples are illustrative of the present invention:

EXAMPLE I

The pressure of urea synthesis effluent consisting of 232 kg./hr. of urea, 214 kg./hr. of ammonia, 80 kg./hr. of carbon dioxide and 92 kg./hr. of water withdrawn from a urea synthesis autoclave operating at a temperature of 200° C. and a gauge pressure of 230 kg./cm.$^2$ was reduced and the effluent fed into the upper part of a high pressure distillation column having plates and operated at a gauge pressure of 20.5 kg./cm.$^2$. This pressure reduction caused some of the excess ammonia to separate and most of the remaining unreacted ammonia and carbon dioxide was distilled off as the effluent passed down the plates. The bottom of the column was heated by steam at a pressure of 10 kg./cm.$^2$ gauge to maintain the temperature at 165° C. The residue from the bottom of the high pressure distillation column consisted of 232 kg./hr. of urea, 32 kg./hr. of ammonia, 12 kg./hr. of carbon dioxide and 120 kg./hr. of water. The pressure of the residue reduced and the residue was introduced into the upper portion of a low pressure distillation column having the same structure as the high pressure distillation column and operated at 2 kg./cm.$^2$ gauge. The temperature in the bottom of the column was maintained at 130° C. by heating with steam and most of the remaining unreacted ammonia and carbon dioxide was distilled off to produce a residue which consisted of 232 kg./hr. of urea, 4 kg./hr. of ammonia, 2 kg./hr. of carbon dioxide and 102 kg./hr. of water. The pressure of the residue was reduced to 0.3 kg./cm.$^2$ gauge and the residue was introduced into a gas separator operating at 115° C. which removed substantially all of the unreacted ammonia and carbon dioxide and produced an aqueous solution of urea consisting of 232 kg./hr. of urea and 90 kg./hr. of water. This aqueous solution of urea was vacuum-concentrated and 200 kg./hr. of urea crystals were separated from the urea mother liquor which consisted of 32 kg./hr. of urea and 10 kg./hr. of water.

The gaseous mixture from the gas separator consisting of 4 kg./hr. of ammonia, 2 kg./hr. of carbon dioxide and 12 kg./hr. of water was fed into a gas condenser and condensed at 50° C. with 20 kg./hr. of water at 0.3 kg./cm.$^2$ gauge to obtain an absorbate consisting of 4 kg./hr. of ammonia, 2 kg./hr. of carbon dioxide and 32 kg./hr. of water. This absorbate was pressurized to 2 kg./cm.$^2$ gauge by a pump; fed into a low pressure absorber and absorbed a gaseous mixture consisting of 28 kg./hr. of ammonia, 10 kg./hr. of carbon dioxide and 18 kg./hr. of water at 50° C. The resulting first absorbate consisted of 32 kg./hr. of ammonia, 12 kg./hr. of carbon dioxide and 50 kg./hr. of water; was pressurized to 20.5 kg./cm.$^2$ gauge and was heated to 100° C. by heat exchanged in the high pressure absorber. The heat generated by absorbing the first gaseous mixture was much more than that transferred to the first absorbate and some of the remaining heat was utilized as a heat source for the vacuum concentration of the aqueous solution of urea while the rest was removed by water cooling to keep the temperature in the bottom of the high pressure absorber at 120° C. The first absorbate from the low pressure absorber was fed into the bottom part of the high pressure distillation column and had the temperature of 100° C. raised to 165° C. by steam in the high pressure distillation column. In the high pressure distillation column, a gaseous mixture consisting of 214 kg./hr. of ammonia, 80 kg./hr. of carbon dioxide and 22 kg./hr. of water was distilled off and transferred to the high pressure absorption column where it was absorbed in urea mother liquor consisting of 32 kg./hr. of urea and 10 kg./hr. of water fed in at the top of the column. The ammonia which was not absorbed was washed with urea liquor described above to produce 134 kg./hr. of pure gaseous ammonia which was withdrawn from the head of the column, condensed by water-cooling and recovered as liquid ammonia.

The second absorbate withdrawn from the bottom of the high pressure absorber had a composition of 32 kg./hr. of urea, 80 kg./hr. of ammonia, 80 kg./hr. of carbon dioxide and 32 kg./hr. of water.

The concentrated absorbate was returned to the urea synthesis. The percentage of raw materials converted increased to 68% and steam consumption in the above described process was only about 0.8 ton as converted per ton of urea product. In comparison, a conventional process conducted using the same operating conditions in the respective columns resulted in a conversion rate of 60% and steam consumption of about 0.95 ton as converted per ton of urea product.

EXAMPLE II

A urea synthesis autoclave operated at a temperature of 200° C. and a gauge pressure of 230 kg./cm.$^2$ produced urea synthesis effuent containing 232 kg./hr. of urea, 214 kg.hr. of ammonia, 80 kg./hr. of carbon dioxide, 93 kg./hr. of water and a very small amount of biuret. The effluent was divided before the pressure reduction into urea synthesis effluent (a) consisting of 200 kg./hr. of urea, 184.4 kg./hr. of ammonia, 69 kg./hr. of carbon dioxide, 79.4 kg./hr. of water and small amount of biuret and a urea synthesis effluent (b) consisting of 32 kg./hr. of urea, 29.6 kg./hr. of ammonia, 11 kg./hr. of carbon dioxide, 12.6 kg./hr. of water and a slight amount of biuret. The pressure of the (a) portion was reduced in a conventional manner and the (a) effluent fed into the upper part of a high pressure distillation column having plates and operated under a gauge pressure of 20.5 kg./cm.$^2$. The reduction in pressure caused most of the excess ammonia to separate.

The first absorbate consisting of 33 kg./hr. of urea, 32 kg./hr. of ammonia, 13 kg./hr. of carbon dioxide, 58 kg./hr. of water and 1 kg./hr. of biuret from a low pressure absorber was preheated to 151° C. by the (b) portion of the urea synthesis effluent in a heat exchanger and was fed into the bottom of the high pressure distillation column. The temperature in the bottom of the column was maintained at 165° C. by a steam heater. The mixture in the bottom of the column had a composition of 233 kg./hr. of urea, 32 kg./hr. of ammonia, 13 kg./hr. of carbon dioxide, 119.4 kg./hr. of water and about 1 kg./hr. of biuret. The pressure of the residue from the high pressure distillation column was reduced to 2 kg./cm.$^2$ gauge and the residue was fed into the upper part of a low pressure distillation column having the same structure as that of the high pressure distillation column. The temperature in the bottom of the low pressure distillation column was kept at 130° C. by steam heating and most of the remaining ammonia and carbon dioxide were distilled off.

The residue from the bottom of the low pressure distillation column consisted of about 233 kg./hr. of urea, 3.8 kg./hr. of ammonia, 1.4 kg./hr. of carbon dioxide, 101.4 kg./hr. of water and about 1.5 kg./hr. of biuret. After the pressure was reduced to 0.3 kg./cm.$^2$, the residue was fed into the gas separator, wherein substantially all of the ammonia and carbon dioxide were separated from the aqueous solution of urea consisting of 232 kg./hr. of urea, 89.4 kg./hr. of water and about 2 kg./hr. of biuret. This aqueous solution containing urea was vacuum-concentrated and 200 kg./hr. of urea crystals were obtained from the urea mother liquor which consisted of 32 kg./hr. of urea, 8 kg./hr. of water and 2 kg./hr. of biuret.

The gaseous mixture consisting of 3.8 kg./hr. of ammonia, 1.4 kg./hr. of carbon dioxide and 12 kg./hr. of water withdrawn from the gas separator was condensed at 50° C. with the urea mother liquor and 10 kg./hr. of water to produce solution consisting of 32 kg./hr. of urea, 3.8 kg./hr. of ammonia, 1.4 kg./hr. of carbon dioxide, 40 kg./hr. of water and 2 kg./hr. of biuret.

The pressure of this solution was raised by a pump and the solution fed into a low pressure absorber at a pressure of 2 kg./cm.$^2$ gauge with the gaseous mixture from the low pressure distillation column consisting of 28.2 kg./hr. of ammonia, 10.6 kg./hr. of carbon dioxide and 18 kg./hr. of water at 50° C. which was absorbed to produce a first absorbate consisting of 32 kg./hr. of urea, 32 kg./hr. of ammonia, 12 kg./hr. of carbon dioxide, 58 kg./hr. of water and 2 kg./hr. of biuret. The pressure of this absorbate was raised to 35 kg./cm.$^2$ gauge by a pump; the absorbate was first heated to 100° C. by a heat exchanger in the bottom of the high pressure absorber and then heated again by (b) effluent to a temperature of 151° C. thereby reducing the biuret content from 2 kg./hr. to ½–1 kg./hr.

The hot low pressure absorbate had the pressure reduced to the pressure of the high pressure distillation column (20.5 kg./cm.$^2$ gauge) and was fed into the bottom of the high pressure distillation column. In the high pressure distillation column, the gaseous mixture consisting of 184.4 kg./hr. of ammonia, 69.0 kg./hr. of carbon dioxide and 18 kg./hr. of water was separated and after exchanging heat with the absorbate from the low pressure absorber was fed from the top of the column. The (b) effluent having a reduced pressure of 20.5 kg./cm.$^2$ gauge was used as the absorbent and the unabsorbed ammonia was washed with an aqueous ammonia solution containing 11.6 kg./hr. of ammonia and 1.4 kg./hr. of water, 145.6 kg./hr. of pure gaseous ammonia was removed from the top of the column and recovered as liquid ammonia. The aqueous ammonia solution, used to wash the unabsorbed ammonia also acted as an absorbent for the gaseous mixture with the second urea synthesis effluent.

The second absorbate consisting of 32 kg./hr. of urea, 80 kg./hr. of ammonia, 80 kg./hr. of carbon dioxide, 32 kg./hr. of water and a slight amount of biuret was withdrawn from the bottom of the high pressure absorber.

The concentrated absorbate was returned to the urea synthesis. The percentage of raw materials converted increased to 68% and steam consumption in the above described process was only about 0.7 ton as converted per ton of urea product. In comparison, a conventional process conducted using the same operating conditions in the respective columns resulted in a conversion rate of 60% and steam consumption of about 0.95 ton as converted per ton of the product urea.

What is claimed is:

1. In a process of synthesizing urea by reacting ammonia with carbon dioxide at urea forming temperatures and pressures, distilling the resulting urea synthesis effluent to separate unreacted substances contained therein, absorbing said gaseous mixture in an absorbent, and recycling the resulting absorbate to said urea synthesis reaction, the improvement which comprises distilling said effluent at a high pressure to obtain a depleted solution and a first gaseous mixture containing ammonia, carbon dioxide and water vapor, distilling said depleted solution at a low pressure to obtain a second gaseous mixture and an aqueous urea solution, concentrating said aqueous urea solution, separating urea from the concentrated solution to obtain a urea mother liquor, absorbing said second gaseous mixture in a first absorbent selected from the group consisting of water, an aqueous ammonia solution, said urea mother liquor and mixtures thereof to form a first absorbate, elevating the pressure and heating at least a part of said first absorbate, distilling said first absorbate with said effluent at a high pressure, absorbing said first gaseous mixture in a second absorbent to form a second absorbate, said second absorbent containing (a) said urea mother liquor when said first absorbent is a member selected from the group consisting of water and an aqueous ammonia solution and said second absorbent containing (b) at least one member selected from the group consisting of water, aqueous ammonia solution, said urea mother liquor and part of said urea synthesis effluent when said first absorbent is said urea mother liquor, said heating of the first absorbate resulting from indirect heat exchange with said second absorbate, condensing the ammonia not absorbed in said second absorbent to liquid ammonia, recycling a part of said liquid ammonia to the high pressure absorption of said first gaseous mixture, and recycling said second absorbate to said urea synthesis reaction.

2. The process of claim 1 wherein said high pressure distillation is conducted at a head temperature of about 110° to about 150° C., a still temperature of about 140° to about 170° C. and a pressure of about 15 to about 30 kg./cm.² gauge.

3. The process of claim 1 wherein said low pressure distillation is conducted at a head temperature of about 80° C. to about 130° C., a still temperature of about 100° to about 140° C. and a pressure of 0 to about 5 kg./cm.² gauge.

4. The process of claim 1 wherein part of said first absorbate is distilled at said high pressure with the urea synthesis effluent and said second absorbent contains the remaining part of said first absorbate.

5. A process as claimed in claim 1 wherein a part of said first absorbate containing said urea mother liquor is distilled at said high pressure and said second absorbent contains the remaining part of said first absorbate.

6. The process as claimed in claim 1 wherein said aqueous urea solution is concentrated at an absolute pressure of 60 to 300 mm. Hg.

7. A process as claimed in claim 6 wherein said aqueous urea solution is concentrated by the heat of absorption generated in said high pressure absorption.

8. A process as claimed in claim 7 wherein urea is separated by subjecting the concentration urea solution to crystallization at a temperature of 40 to 70° C.

9. In a process of synthesizing urea by reacting ammonia with carbon dioxide at urea forming temperatures and pressures, distilling the resulting urea synthesis effluent to separate unreacted substances contained therein, absorbing said gaseous mixture in an absorbent, and recycling the resulting absorbate to said urea synthesis reaction, the improvement which comprises distilling said effluent at a high presure to obtain a depleted solution and a first gaseous mixture containing ammonia, carbon dioxide and water vapor, distilling said depleted solution at a low pressure to obtain a second gaseous mixture and an aqueous urea solution, concentrating said aqueous urea solution, separating urea from the concentrated solution to obtain a urea mother liquor, condensing at least a part of said second gaseous mixture by indirect heat exchange with said aqueous urea solution to form an aqueous ammonium carbamate solution whereby the heat generated in said condensation is utilized for the concentration of said aqueous urea solution, absorbing the uncondensed gaseous mixture in a first absorbent selected from the group consisting of water, an aqueous ammonia solution, said urea mother liquor and mixtures thereof to form a first absorbate, elevating the pressure and heating at least a part of said first absorbate, distilling said first absorbate with said aqueous ammonium carbamate and urea effluent at a high pressure, absorbing said first gaseous mixture in a second absorbent to form a second absorbate, said second absorbent containing (a) said urea mother liquor when said first absorbent is a member selected from the group consisting of water and an aqueous ammonia solution and said second absorbent containing (b) at least one member selected from the group consisting of water, aqueous ammonia solution, said urea mother liquor and part of said urea synthesis effluent when said first absorbent is said urea mother liquor, said heating of said first absorbate resulting from indirect heat exchange with said second absorbate and recycling said second absorbate to said urea synthesis reaction.

10. A process as claimed in claim 9 wherein the ammonia not absorbed in said second absorbent is condensed to liquid ammonia and at least a part of the liquid ammonia is recycled to the high pressure absorption of said first gaseous mixture.

References Cited

UNITED STATES PATENTS

| 2,694,728 | 11/1954 | Lento et al. | 260—555 |
| 3,155,723 | 11/1964 | Kurpit et al. | 260—555 X |
| 3,200,148 | 8/1965 | Cook et al. | 260—555 |
| 3,232,985 | 2/1966 | Cook et al. | 260—555 |
| 3,281,464 | 10/1966 | Tsao | 260—555 |
| 3,258,486 | 6/1966 | Cook | 260—555 |
| 3,305,582 | 2/1967 | Cook et al. | 260—555 |

FOREIGN PATENTS

| 917,004 | 1/1963 | Great Britain. |

NORMAN YUDKOFF, Primary Examiner

F. E. DRUMMOND, Assistant Examiner

U.S. Cl. X.R.

203—42, 73